Aug. 18, 1959  R. H. McGLONE  2,900,012
SEAT CUSHION
Filed Dec. 10, 1957
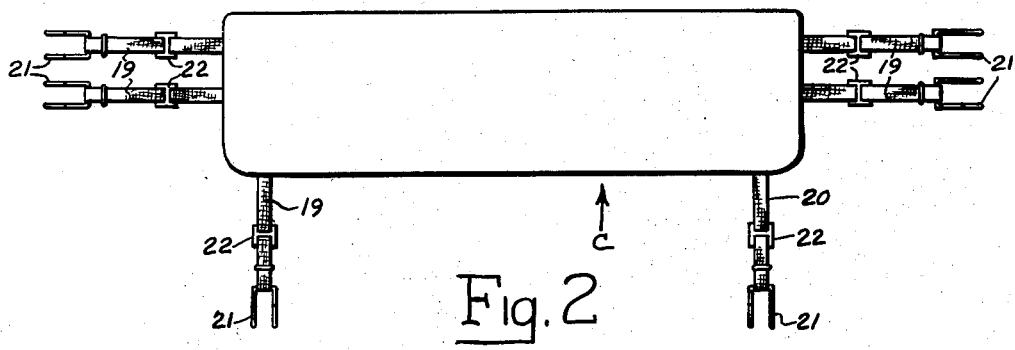
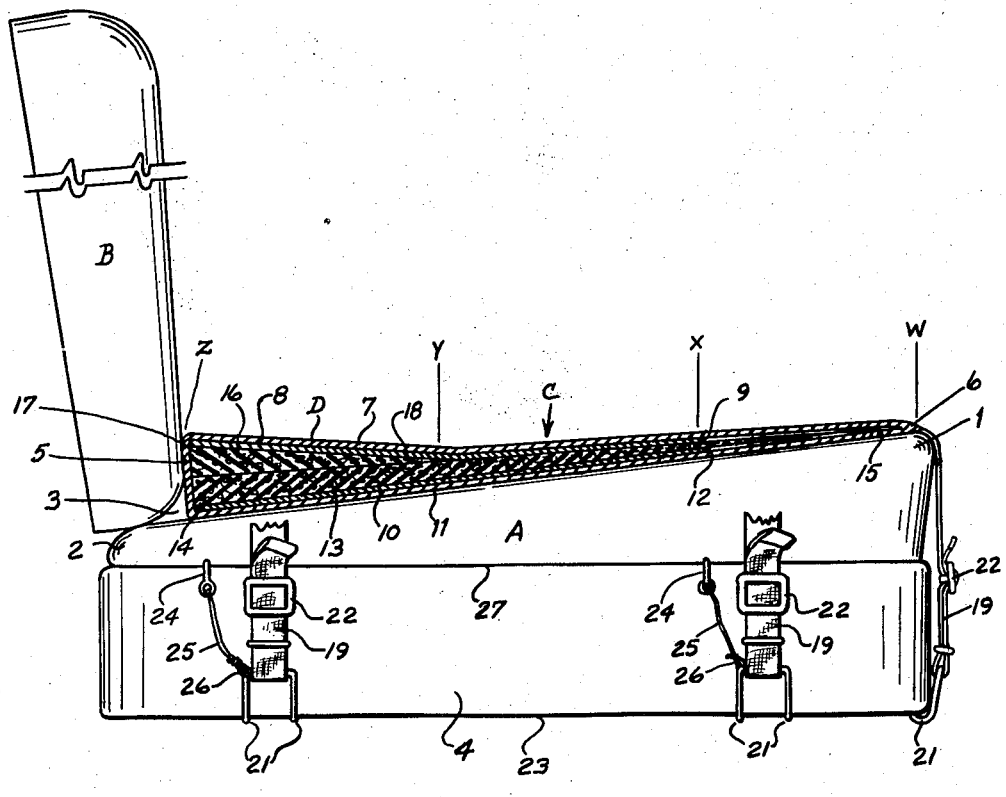
INVENTOR.
ROSCOE H. McGLONE
BY
ATTORNEY

United States Patent Office 2,900,012
Patented Aug. 18, 1959

2,900,012

SEAT CUSHION

Roscoe H. McGlone, Flint, Mich.

Application December 10, 1957, Serial No. 701,751

3 Claims. (Cl. 155—182)

This invention relates to a seat cushion which, although it is suitable for use with many types of seats, is more particularly and specifically intended for use with the conventional seat of a motor vehicle, and is so illustrated in the drawings, and is accordingly described in conjunction with a motor car seat.

The primary object of the invention is to provide a cushion for use with a seat which has an inclination from front to rear so as to provide a seat which causes the vehicle driver to sit upon a more level support and in a natural and relaxing position.

Another object of the invention is to provide a seat cushion which provides the utmost in cushioning to protect the lower spine and to provide a cushion where it is most needed.

A still further object of the invention is to provide a cushion which supports the user above the sharp corner where the seat and the seat back meet, which corner causes discomfort to those using the seat.

Another object of the invention is to provide a seat cushion which cushions the user against road shock, causes the user to sit in a natural position and tends to cause the user to throw back his shoulders, which in turn results in deeper relaxed breathing.

Still another object of the invention is to provide a seat cushion which covers the entire width and length of the seat and is provided with means to secure the cushion in proper position upon and against displacement from the seat.

Other objects, advantages, as well as novel features of construction of the improved seat cushion, will appear from the following description when read in the light of the accompanying drawings.

In the drawings:

Fig. 1 is a view in end elevation of a conventional automobile seat having the improved seat cushion associated therewith, the cushion being illustrated in vertical section.

Fig. 2 is a top plan view of the improved cushion.

The improved seat cushion is illustrated, in vertical section, in conjunction with an automoblie seat in Fig. 1 of the drawings. The seat is designated at A and the seat back at B. As is conventional, the seat inclines downwardly and rearwardly from its front edge 1 to its rear edge 2. The seat and back between them form a corner 3 which extends the entire length of the seat. Vehicle seats of the nature illustrated are supported in an open rectangular frame, and in Fig. 1 one end 4 of such a frame is illustrated.

The present improved cushion is designated as an entirety by C and as it is intended to extend the full length and width of the seat with which it is used, it like the seat is, in plan view rectangular in shape, as clearly appears in Fig. 2 of the drawings.

It is the intent of the seat cushion to support the user of the seat upon a more level support than is provided by the inclined seat and the cushion is therefore of a triangular shape when viewed in transverse vertical section, as will clearly appear from Fig. 1 of the drawings. The cushion as a consequence of its triangular cross sectional configuration has a relatively high rear end 5 and from this end forwardly the cushion tapers off to a feather-edged front end 6 which end is the apex of the triangle.

The cushion comprises an outer covering D which is preferably made of a washable and very durable material having a plastic coated outer surface. An instance of a suitable covering material would be that which is known as "Naugahyde." It will be understood, however, that other materials could be used for the cover without departing from the inventive concept.

The interior of the cover could be filled with any suitable resilient material such as a piece of foam rubber, but it has been found desirable not to use a single piece of foam rubber but to use several individual pieces of rubber and other material as a filling for the cover, and a construction of this kind is illustrated in Fig. 1 of the drawings. Here it will be seen that at the under side of the top 7 of the cover there is a piece of felt 8 which extends from the rear end of the cushion forwardly and terminates at a point 9 about two-thirds the distaince to the front edge 6 of the cushion. A similar piece of felt 10 is on the inner face of the cover bottom 11 and is of the same size as the heretofore referred to piece of felt and terminates at the point 12 immediately below the termination of the upper piece of the felt. Immediately above the lower piece of felt 10 is a strip or ply of sponge rubber 13 which has a comparatively thick rear end 14 at the rear end of the cushion and feathers out to a feather edge 15 at the front edge of the cushion. Immediately above the foam rubber ply 13 is a second strip or ply of foam rubber 16 which has a comparatively thick rear end 17 at the rear edge of the cushion and feathers out to a feather edge 18 which terminates at a point about one-third the distance towards the front edge of the cushion and accordingly is only about one-third the width or depth of the cushion.

With the construction thus far described it will be seen that the cushion provides a seat which is substantially level throughout that portion of the seat which extends rearwardly between the lines W and Y and that between the lines Y and Z the cushion inclines slightly upward. It is that part of the cushion between the lines Y and Z which will sustain the greatest weight of the user and it is this portion of the cushion which will offer the maximum support and padding for the spine of the user.

Considering the cover, the strips of felt and the strips of foam rubber as each constituting a "ply," it will be seen that that portion of the cushion between the lines W and X is 3-ply and that that portion of the cushion between the lines X and Y is 5-ply and that that portion of the cushion between the lines Y and Z is 6-ply in thickness.

A seat cushion made in accordance with the construction illustrated and described has been found to have the desirable attributes hereinbefore pointed out and to provide a most restful seat for the drivers and passengers of an automobile.

It is of course essential to provide quick and easy means to secure the cushion in place upon the vehicle seat and to remove the cushion when desired. To this end the cushion adjacent each of its forward corners is provided with a strap and these are designated 19 and 20. Each of these straps is provided at its end with a pair of hooks 21 and each strap is provided with a buckle 22 for shortening or lengthening the strap. A pair of similarly constructed straps, similarly numbered, are at each end of the cushion.

When the cushion is in place upon the seat the strap lengths are properly adjusted and the hooks 21 are secured beneath the bottom edge 23 of the seat supporting frame 4. Even with the straps properly adjusted the hooks could become disengaged provided a person of sufficient weight sat upon the seat and cushion. If the weight of such a person were sufficient the hooks 21 could move downwardly sufficiently far to become disengaged from the lower edge of the seat supporting frame. To prevent the possibility of this occurrence a supplemental hook is associated with each strap. These hooks are designated 24 and are attached by a cord 25 or the like as at 26 to its respective pair of main hooks 21. The supplemental hooks 24 are hooked over the upper edge 27 of the seat supporting frame 4 and it will be understood that even with sufficient weight on the seat to put into the straps 19 sufficient slack as to permit the hooks 21 to become disengaged, this disengagement will be prevented as the hooks 24 through the cords 25 will hold the hooks 21 upwardly and in engagement with the lower edge of the seat supporting frame. Should it be found desirable a coil spring could be included in the connection between each hook 24 and its respective pair of hooks 21.

Departures from the specific constructions illustrated and described can be made without departing from the inventive concept which is to be limited only within the scope of the hereinafter following claims.

What I claim is:

1. For use with a vehicle seat wherein the seat is supported upon a frame and slants downwardly from its front edge towards its rear edge and is provided at its rear edge with a back, a seat cushion of a size to completely cover the top of the seat which is forward of the seat back, said cushion being of a triangular configuration in transverse vertical section with the apex of the triangle at the front edge of the cushion, the back edge of the cushion abutting the front of the seat back, straps secured to the front and side edges of the cushion, each strap being provided with a hook each of which is hooked beneath the lower edge of the seat supporting frame, each strap having therein a buckle arrangement whereby the strap can be shortened or lengthened to properly position the hooks, and a supplemental hook associated with each strap carried hook and being hooked over the upper edge of the seat supporting frame and serving to prevent sufficient downward movement of said strap carried hooks as would result in disengagement of said hooks with the lower edge of the seat supporting frame.

2. For use with a vehicle seat wherein the seat slants downwardly from its front edge towards its rear edge and is provided at its rear edge with a back, a seat cushion of a size to completely cover the top of the seat which is forward of the seat back, said cushion being of a triangular configuration in transverse vertical section with the apex of the triangle at the front edge of the cushion, the back edge of the cushion abutting the front of the seat back, said cushion comprising an outer cover having interiorly upper and lower strips of felt and a pair of strips of foam rubber each of which is of triangular configuration in transverse vertical section, the cushion throughout the rear one-third of its width being composed of 6 plies of material, the middle one-third of the cushion being composed of 5 plies of material, and the forward one-third being composed of 3 plies of material, and the bases of the triangular shaped strips of foam rubber being positioned at the rear edge of the cushion.

3. For use with a vehicle seat wherein the seat slants downwardly from its front edge towards its rear edge and is provided at its rear edge with a back, a seat cushion of a size to completely cover the top of the seat which is forward of the seat back, said cushion being of a generally triangular configuration in transverse vertical section with the apex of the triangle at the front edge of the cushion, the back edge of the cushion abutting the front of the seat back, said cushion comprising an outer cover having interiorly upper and lower strips of felt and a pair of strips of foam rubber each of which is of a triangular configuration in transverse vertical section, one of said foam rubber strips being a bottom strip and extending from the rear of the cushion to substantially the front edge thereof, the other of said foam rubber strips extending from the rear edge of the cushion and having its apex terminating at a point which is substantially one-third of the distance from the back of the cushion to the front edge of the cushion, said construction resulting in a cushion which in combination with the seat provides a seat which is substantially level from its front edge to a point substantially two-thirds of the depth of the seat with the remaining one-third of the depth of the seat inclining upwardly to the seat back.

References Cited in the file of this patent

UNITED STATES PATENTS

| 1,673,636 | Perry | June 12, 1928 |
| 2,731,542 | Daniels | Jan. 17, 1956 |

OTHER REFERENCES

Air Rubber Corp., Catalog, page 9, 1926. (Copy in Div. 8.)